United States Patent [19]
Seifert et al.

[11] Patent Number: 5,200,265
[45] Date of Patent: Apr. 6, 1993

[54] CRYSTALLINE PLASTIC BODY WITH OUTER AMORPHOUS PLASTIC SURFACE LAYER

[75] Inventors: Keith L. Seifert, Torrington; Robert E. Furst, Griswold, both of Conn.

[73] Assignee: The Torrington Company, Torrington, Conn.

[21] Appl. No.: 816,686

[22] Filed: Jan. 2, 1992

Related U.S. Application Data

[62] Division of Ser. No. 681,283, Apr. 8, 1991, Pat. No. 5,104,241.

[51] Int. Cl.$^5$ ............ B32B 18/00; B32B 7/04; F16C 33/56
[52] U.S. Cl. .................... 428/325; 428/413; 428/420; 428/409; 384/573; 384/120; 384/420
[58] Field of Search ............ 428/420, 413, 409, 325; 384/573

[56] References Cited

U.S. PATENT DOCUMENTS

| | | | |
|---|---|---|---|
| 2,977,164 | 10/1959 | Schack | 308/217 |
| 3,028,204 | 10/1959 | Schaeffler | 308/217 |
| 3,388,952 | 6/1968 | Schaeffler | 308/217 |
| 3,733,111 | 5/1973 | Harlan et al. | 308/218 |
| 3,881,790 | 5/1975 | Ryanen | 308/217 |
| 4,339,374 | 7/1982 | Olschewski et al. | 308/217 |
| 4,744,679 | 5/1988 | Verburg et al. | 384/523 |
| 4,879,176 | 11/1989 | Ouderkirk et al. | 428/421 X |
| 4,934,841 | 6/1990 | De Vito | 384/572 |
| 4,997,295 | 5/1991 | Saitou | 384/492 |
| 5,043,251 | 8/1991 | Sonnenschein et al. | 430/297 |
| 5,066,536 | 11/1991 | Cogswell et al. | 428/401 X |

FOREIGN PATENT DOCUMENTS

| | | |
|---|---|---|
| 63-256422 | 10/1988 | Japan. |
| 1-283127 | 11/1989 | Japan. |
| 2079867A | 1/1982 | United Kingdom. |

OTHER PUBLICATIONS

European Patent Application 0 492 660 A1, Jul. 1992, pp. 2-6, Shoji et al.

Primary Examiner—P. C. Sluby
Attorney, Agent, or Firm—John C. Bigler

[57] ABSTRACT

A plastic part is molded of a plastic with an inner body of crystalline plastic and an outer surface layer of an amorphous plastic. The amorphous surface layer withstands friction loading at least during an initial break-in period. In one embodiment, the amorphous surface is formed by using a higher plastic melt temperature and/or a lower mold temperature than normal. In another embodiment, an intermediate part is molded as a crystalline intermediate part, and a surface layer is heated and quenched to form the amorphous surface layer on the final part. A bearing cage is molded by injecting the plastic melt at a single point intermediate the ends of a single bar of the bearing cage to permit formation of the desired amorphous layer on rails connected to the ends of the bars.

7 Claims, 2 Drawing Sheets

CRYSTALLINE PLASTIC BODY WITH OUTER AMORPHOUS PLASTIC SURFACE LAYER

This is a division of application Ser. No. 681,283 filed Apr. 8, 1991 now U.S. Pat. No. 5,104,241.

BACKGROUND OF THE INVENTION

The present invention relates generally to bearing cages for use in rotating machinery and, more particularly, to bearing cages molded of a polymer.

Bearing cages are conventionally used in ball and roller bearings to retain and separate rolling elements (rollers, needles or balls) in predetermined relative positions. The bearing cages lie between inner and outer bearing races.

In certain applications, bearing cages are exposed to relatively difficult conditions that limit the useful life of the bearing cages or require the use of complex and expensive construction. One such application is in the needle bearing assembly for a crank of a two-cycle engine such as, for example, an outboard motor.

In such an application, the needle bearing assembly is exposed to high loads generated by combustion pressure, inertia of the parts, and centrifugal force. This application is so severe that a special high precision bearing cage made of silver-plated steel, is generally used. The silver is believed to act as a lubricant, at least during a break-in period of the bearing.

There are numerous disadvantages to the above-described bearing cage. The high precision requires numerous steps for manufacture, such as piercing, heat treating, grinding, and chemical finishing. The initial cost of tooling is very high, and the chemical by-products produced during manufacture result in environmental problems of disposal. In addition, because of the many operations which must be performed, the time for manufacture of such bearing cages is long. Thus, a larger than desired inventory of work in process must be maintained. The large number of operations, combined with the required precision, may result in high labor costs or a relatively high scrap rate. And, the required silver substantially adds to the cost.

The foregoing illustrates limitations known to exit in present bearing cages. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing cage, or other part required to withstand a friction load, made of a crystalline plastic resin. The part comprises an inner crystalline body and an amorphous outer layer. The outer amorphous layer has a thickness and a frictional characteristic effective for improving the ability of the plastic part to withstand the friction load.

In another aspect of the present invention, this is accomplished by alternative methods for producing such a plastic part with an amorphous case.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
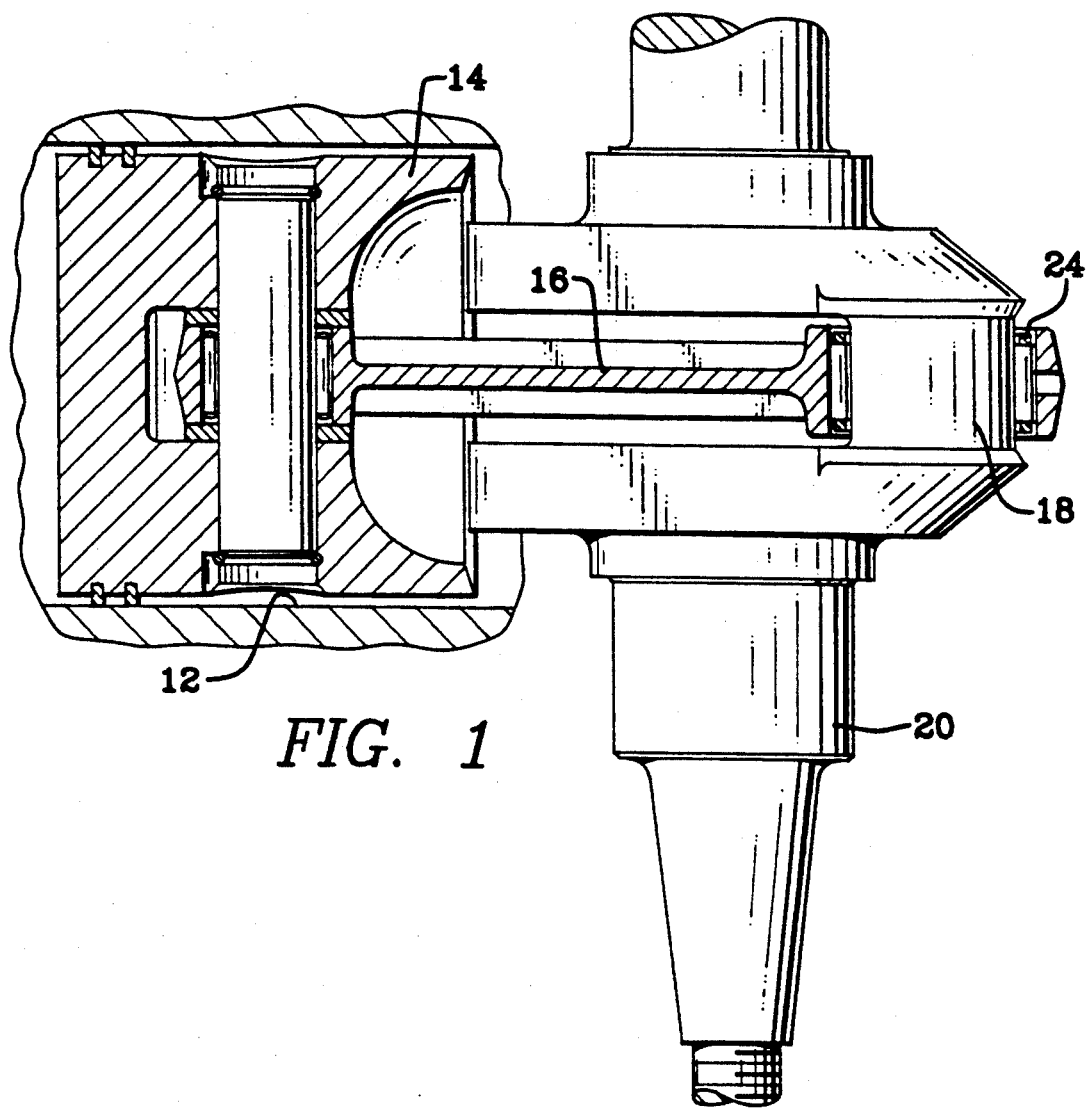
FIG. 1 is a sectional view of a portion of a two-cycle engine showing the location of a crank pin upon which a bearing cage of the present invention may be installed.

Referring first to FIG. 1, the illustrate portion of a two-cycle engine 10 includes a cylinder 12 in which reciprocates a piston 14. A connecting rod 16 transmits the reciprocating motion of piston 14 to a crank pin 18 eccentrically disposed on a crank 20. A driveshaft, not shown, is rigidly affixed to crank 20. The reciprocating motion of piston 14 is thus converted to desired rotary motion of the driveshaft through the action of connecting rod 16 and crank 20.

A needle bearing assembly 24 (not shown in detail in FIG. 1) provides rolling contact between crank pin 18 and connecting rod 16. As noted in the description of the background of the invention, needle bearing assembly 24 is subjected to severe forces in this location. As previously stated, bearing cages in that application are conventionally made of silver-plated steel.

Figure 2:
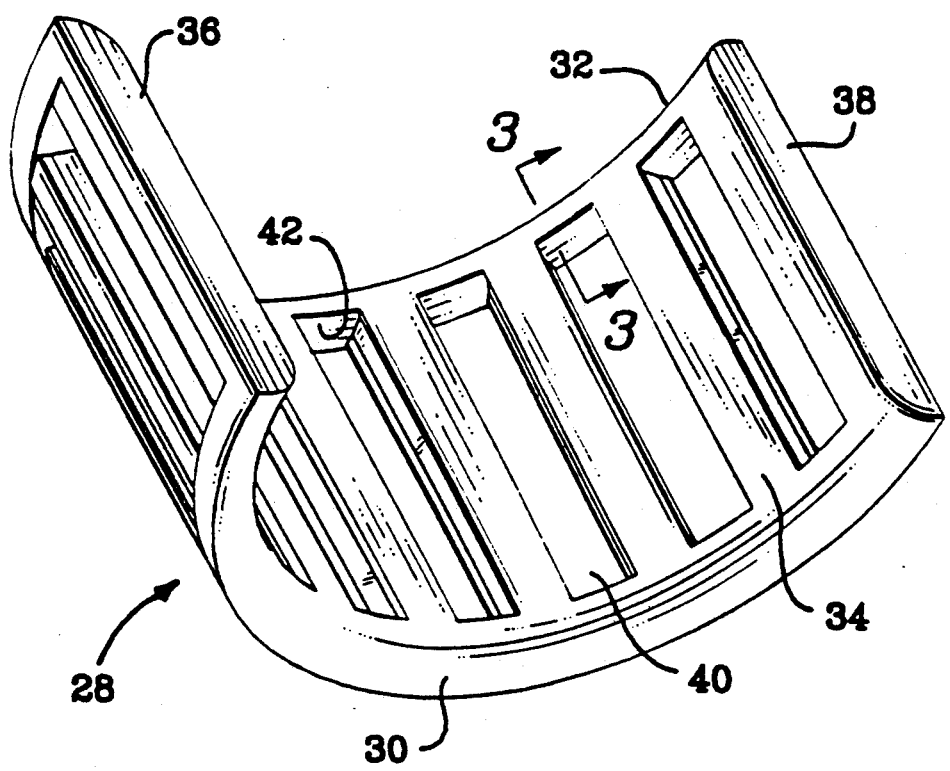
FIG. 2 is a perspective view of half of a bearing cage according to an embodiment of the present invention.

A bearing cage of needle bearing assembly 24 includes a mating pair of cage halves 28, one of which is shown in FIG. 2. Each cage half 28 consists of first and second rails 30 and 32 separated by bars 34. End plates 36 and 38 close the distal ends of cage half 28. Each adjacent pair of bars 34 defines a pocket 40 into which a bearing roller, needle, or ball is inserted. The two ends of each pocket 40 are defined by inner surfaces 42 on rails 30 and 32. Only the inner surface 42 of rail 32 is visible in FIG. 2; the other is hidden.

With regard to overall shape, cage half 28 is similar to the conventional silver-plated steel device, previously described.

A bearing cage could be molded of a crystalline thermal plastic such as, for example, polyetheretherketone (PEEK) with glass fillers in the shape illustrated in FIG. 2, following industry standards for mold temperature, plastic resin temperature, and other parameters. However, such a part would fail prematurely and be unsatisfactory in this severe application.

In contrast, the present invention involves varying the molding parameters from conventional procedures, contrary to the teachings of the industry. As a result, cage half 28 does not have a uniform crystalline structure. Cage half 28 has a crystalline portion encased in an amorphous surface layer.

Figure 3:
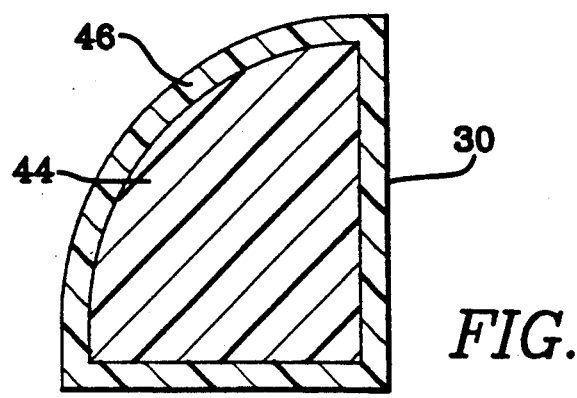
FIG. 3 is a cross-sectional view of a rail of the bearing cage of FIG. 2, as indicated by the line 3—3.

Referring now to FIG. 3, rail 30 is seen to consist of an inner body 44 of crystalline plastic encased in a relatively thin outer layer 46 of amorphous plastic. The crystalline plastic is recognizable due to its tan-amber color, whereas the amorphous plastic appears as an amber-orange color. Testing according to ASTM thermal analysis test procedure D3417 confirms that outer layer 46 is, indeed, amorphous.

It is contrary to industry practice to mold a crystalline plastic part with an amorphous outer layer. Instead, it is industry practice to mold the entire part as crystalline and to consider a plastic part with an amorphous outer layer as defective. The industry teaches that the temperature of the mold should be from about 325 to 350 degrees F. with a PEEK resin temperature of about 700 degrees F.

The procedures employed in the present invention are contrary to good molding practice as previously taught. The desired structure illustrated in FIG. 3 is formed with a mold temperature of between about 250 and 275 degrees F. and a PEEK resin temperature of about 750 degrees F. In addition, Applicants have discovered that the location of the gate, through which molten plastic flows during injection, is important in some applications. Apparently, the region in the vicinity of the gate receives sufficient heat from the incoming plastic resin to become crystalline, even on its outer surface.

Applicants have found that wear is most likely on the surfaces of rails 30 and 32. Little if any wear problem occurs in bars 34 since these contact only the very smooth surfaces of the bearing needles (not shown). For that reason, it is preferable to employ a single gate in the center of one of bars 34. The surface of this bar 34, in the vicinity of the gate, becomes crystalline. However, rails 30 and 32 are sufficiently distant from the gate in this bar 34 to be formed with outer layer 46 of amorphous plastic.

The exact thickness of outer layer 46 for best operation has not yet been determined. It is believed that a thickness of a few thousandths of an inch is satisfactory. The thickness of outer layer 46 can be changed at will by varying molding parameters. For example, one or more of the following changes in parameters increase the thickness of the amorphous layer: reducing the temperature of the mold, decreasing the injection speed, and decreasing the injection pressure immediately before closing off the gate. Changing one or more of these parameters in the opposite direction reduces the thickness of the amorphous layer.

Service tests in a two-cycle engine appear to indicate that use of a bearing cage according to this invention also increases the life of the entire two-cycle engine. This may result from the fact that cage half 28 is only one-third the weight of its silver-plate steel counterpart, thus reducing the inertial and centrifugal loading. Besides reducing loading on parts immediately adjacent to the bearing cage, the reduced weight may reduce engine vibration sufficiently to increase the life of components elsewhere in the two-cycle engine.

The above description of the invention is directed to an environment of a bearing cage in a two-cycle engine. However, the invention should not be considered limited either to a bearing cage or to a two-cycle engine. Certain thrust washers and annular shaft seals, for example, are fabricated of silver-plated steel to reduce frictional wear. It is believed that the plastic molding technique of the present invention may be advantageously employed to produce a thrust washer or annular shaft seal, as well as other parts.

Although it is not intended that the scope of the present invention be limited to a particular theory, applicants believe that the amorphous outer layer on cage half 28 tends to act as a lubricant or as a sacrificial break-in surface, and tends to smear out over or otherwise conform to mating surfaces in needle bearing assembly 24 during break-in. With the mating surfaces thus smoothed and lubricated, friction is believed to be reduced sufficiently to give a substantial improvement in the life of the bearing cage.

Molding cage half 28 using the above non-standard molding parameters is only one way to achieve the structure of the present invention. For example, cage half 28 may be molded using conventional parameters to produce an intermediate product entirely of crystalline plastic. Then, the surface may be melted and rapidly quenched to produce the amorphous surface layer. Alternatively, the output of an industrial laser may be directed against the surfaces of bearing cage half 28 to melt a thin outer layer. Then the part may be plunged into a cooling bath, or be rapidly cooled by liquid spray or air stream.

A further way in which the part may be formed includes producing a crystalline intermediate product which is then dipped into a heated bath for a sufficient time to melt the outer layer. Then, the part is withdrawn from the bath and cooled by one of the above cooling techniques. For example, the part may be plunged into a bath of molten lead or tin for a short time, then withdrawn and quenched.

It is believed that other crystalline plastics may be employed according to the present invention. The techniques for forming parts according to the present invention will vary with the particular crystalline plastic employed. It is believed that the present invention may employ nylon or polyacetal plastic, among other, either with or without suitable fillers. One skilled in the art, in light of the present specification, would be fully enabled to establish required parameters for fabrication of parts using such materials.

The present invention provides a bearing cage molded of plastic resin and having a significantly improved life, even in difficult applications such as the needle bearing assembly for a crank of a two-cycle engine. In extended tests, the useful life of the bearing cage of the present invention has exceeded the normally expected life. The bearing cage of the present invention provides substantial cost savings compared with silver-plated steel bearing cages previously used.

Having described the invention, what is claimed is:

1. A plastic part composed of a thermoplastic resin, said plastic part comprising:
    a crystalline portion composed of said thermoplastic resin in a crystalline state; and
    an amorphous outer layer composed of said thermoplastic resin in an amorphous state overlying at least a part of said crystalline portion for improving the ability of said plastic part to withstand friction without failure.

2. A plastic part according to claim 1, wherein said plastic resin is polyetheretherketone.

3. A plastic part according to claim 1, wherein said thermoplastic resin includes a glass filler.

4. A plastic part according to claim 1, wherein said amorphous outer layer has a thickness greater than 10,000 nm.

5. A plastic part according to claim 1, wherein the plastic part comprises a bearing cage.

6. A plastic part according to claim 1, wherein the plastic part comprises a thrust washer.

7. A plastic part according to claim 1, wherein the plastic part comprises an annular shaft seal.

* * * * *